April 19, 1932.                G. ROTTMAN                1,854,766
                              ANTISKID DEVICE
                    Filed Sept. 5, 1929       2 Sheets-Sheet 1
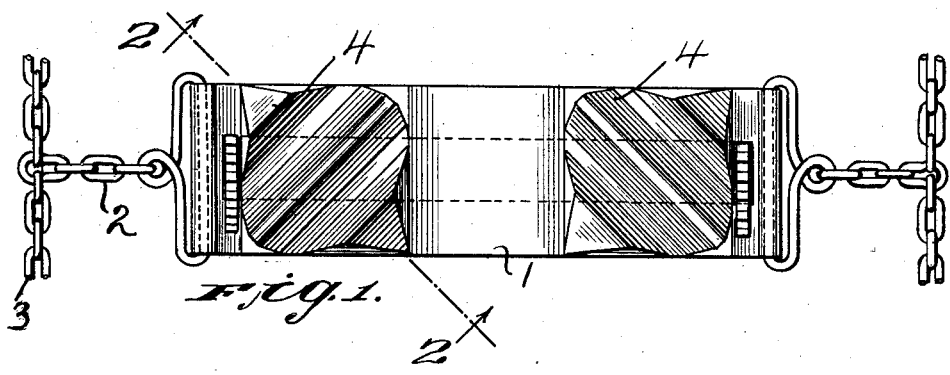
Fig. 1.
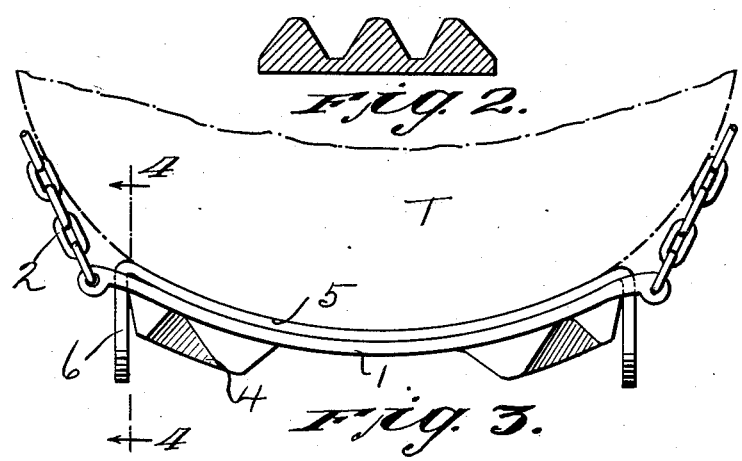
Fig. 2.
Fig. 3.
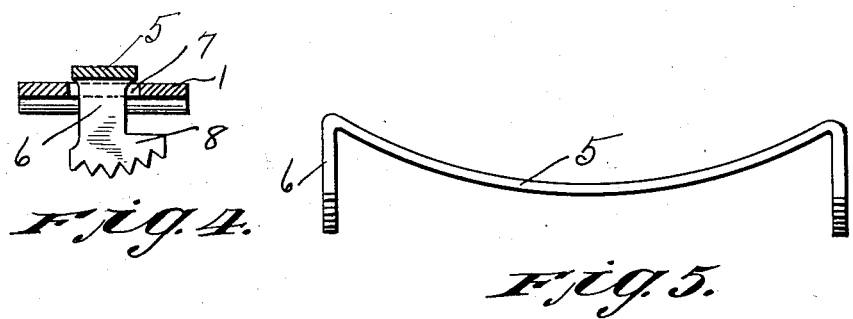
Fig. 4.
Fig. 5.
INVENTOR
George Rottman
BY Mock & Blum
ATTORNEYS

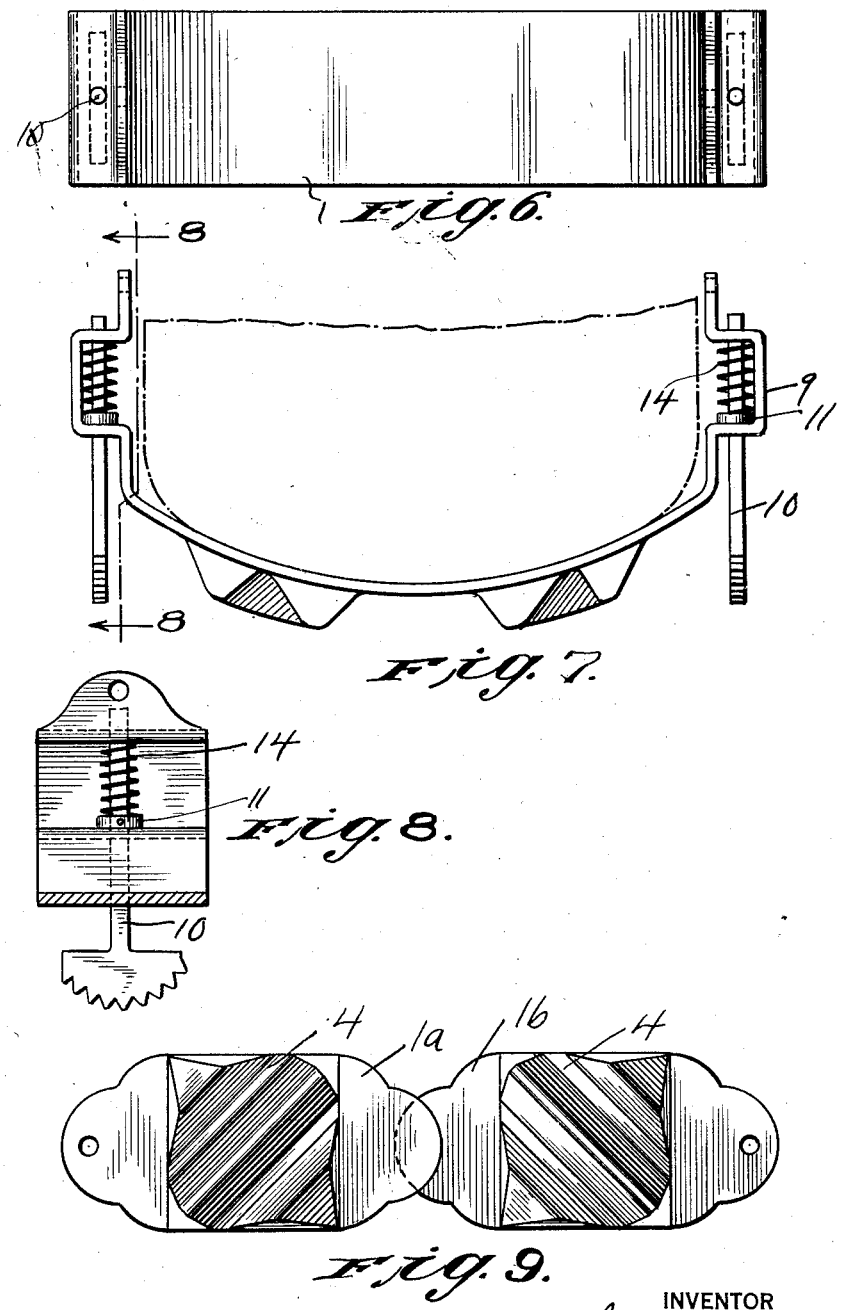

Patented Apr. 19, 1932

1,854,766

UNITED STATES PATENT OFFICE

GEORGE ROTTMAN, OF NEW YORK, N. Y.

ANTISKID DEVICE

Application filed September 5, 1929. Serial No. 390,500.

My invention relates to a new and improved anti-skid device.

One of the objects of my invention is to provide an anti-skid device for automobiles which shall be especially useful in preventing skidding on ice or snow.

Another object of my invention is to provide an anti-skid device which shall comprise or include a plurality of shoes having projections capable of gripping a slippery road surface in an effective manner.

Another object of my invention is to provide an anti-skid device which shall include spurs resiliently mounted, and capable of securely gripping a slippery road surface.

Other objects of my invention will be set forth in the following description and drawings which illustrate preferred embodiments thereof, it being understood that the above general statement of the objects of my invention is intended to merely generally explain the same and not to limit it in any manner.

Fig. 1 is a plan view of an anti-skid element, together with the associated chain support.

Fig. 2 is a sectional view on the line 2—2 of Fig. 1.

Fig. 3 is a side elevation of the device shown in Fig. 1.

Fig. 4 is a sectional view on the line 4—4 of Fig. 3.

Fig. 5 is a side elevation of the spur member.

Fig. 6 is a plan view of another embodiment of the invention.

Fig. 7 is a side elevation of the device shown in Fig. 6.

Fig. 8 is a sectional view on the line 8—8 of Fig. 7.

Fig. 9 is a plan view of a third embodiment of the invention.

In the embodiment shown in Figs. 1–5, the anti-skid elements 1 are stamped or cast of any suitable metal and they are provided with lateral chains 2 and with longitudinal chains 3 which hold the anti-skid elements 1 on the periphery of the tire T, in the well known manner. The anti-skid element or shoe 1 is preferably provided with a smooth central portion, and with projections 4 which are inclined towards each other, so that they grip the road surface along diagonal lines.

I prefer to make the anti-skid shoes 1 out of cast metal, but it would not be departing from my invention if said shoes 1 were made of stamped metal. Each of the shoes 1 is provided with a spur member 5, which is preferably made of stamped metal and which is somewhat resilient. The member 5 is provided with outwardly projecting spurs 6, which project through slots 7 in the shoes 1. As shown in Fig. 4, the spurs 6 are provided with offset shoulders 8 so that the parts can be assembled by passing the spurs 6 through the slots 7 while the spur member 5 is held in inclined position. The parts can then assume the relative positions shown in Figs. 3 and 4, to form an assembled unit. The teeth of the spurs 6 project slightly beyond the projections 4, so that the weight of the automobile causes the spurs 6 to securely grip the road surface.

It will be noted that the anti-skid projections 4 are transversely or laterally arranged. Likewise, the spur means 6, which project upon the spur-bearing member 5 are also laterally or transversely arranged.

Hence, the spurs 6 simultaneously contact with the road and they operate to radially and bodily move the member 5 inwardly, with respect to the anti-skid shoe 1. When the member 5 is forced inwardly with respect to the member 1, the tread of the tire is slightly deformed, but this is accomplished with a minimum of injury to the tire.

In the embodiment shown in Figs. 6–8, the shoes 1 are provided with projections 4 as previously described. The shoes 1 are also provided with U-shaped wings 9, in which the spurs 10 are slidably mounted. Each spur 10 has a washer 11 secured thereto, and a compression spring 14 serves to hold the spurs 10 in the position shown in Figs. 7 and 8. The spurs 10 may have any desired length and they may project beyond the projections 4.

In the embodiment shown in Fig. 9, the anti-skid shoes consist of two separate parts 1ᵃ and 1ᵇ, which may be articulated or connected in any suitable manner.

As shown in Fig. 3, the anti-skid shoes conform to the lateral contour of the tire T. That is, the central line of the anti-skid shoe is transverse to the plane of the tire.

In Fig. 1, the chains 2 are aligned with the central axis of the shoe. I have shown preferred embodiments of my invention, but it is clear that numerous changes and omissions can be made without departing from the spirit of my invention.

I claim:

In combination with a tire, an anti-skid shoe connected to said tire so that said shoe is held transversely with respect to said tire, the inner surface of said anti-skid shoe generally conforming to the transverse contour of the tire, and a spur-bearing member located between said tire and the inner surface of said shoe, said spur-bearing member also generally conforming to the transverse contour of the tread of the tire, said spur-bearing member being radially movable with respect to said anti-skid shoe, said anti-skid shoe having transversely arranged anti-skid projections on its outer surface, said spur-bearing members having transversely arranged spur means projecting beyond said anti-skid projections, said anti-skid projections being located between said spur means.

In testimony whereof I affix my signature.

GEORGE ROTTMAN.